Jan. 18, 1944.　　J. H. THOMAS ET AL　　2,339,590
PRESSURE REGULATOR
Filed June 29, 1940　　2 Sheets-Sheet 1
Fig. 1.
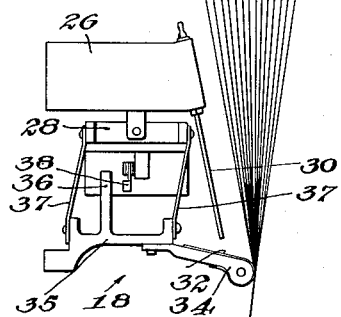
Fig. 2.
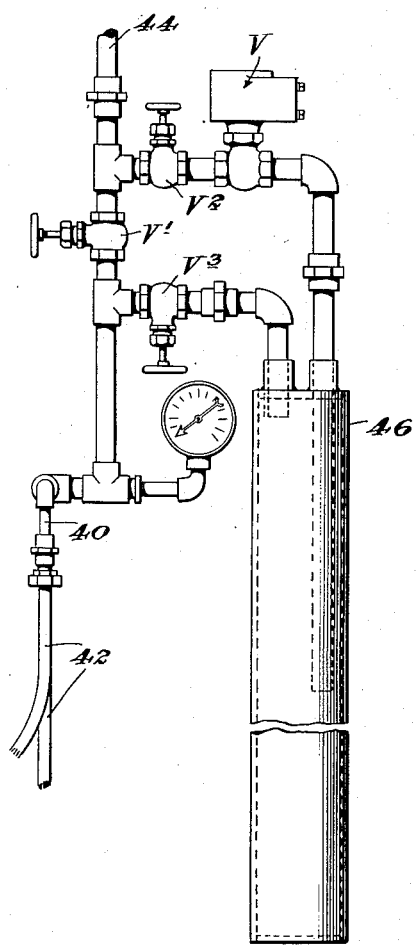
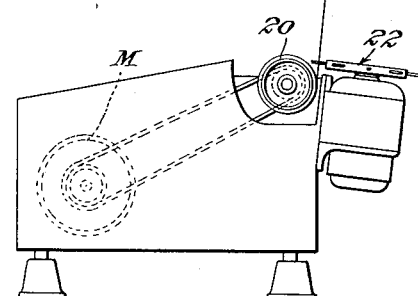
INVENTORS
J. H. Thomas and
Nicholas Dragics
BY
ATTORNEY

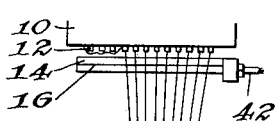
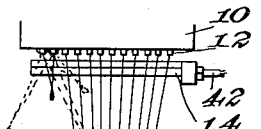
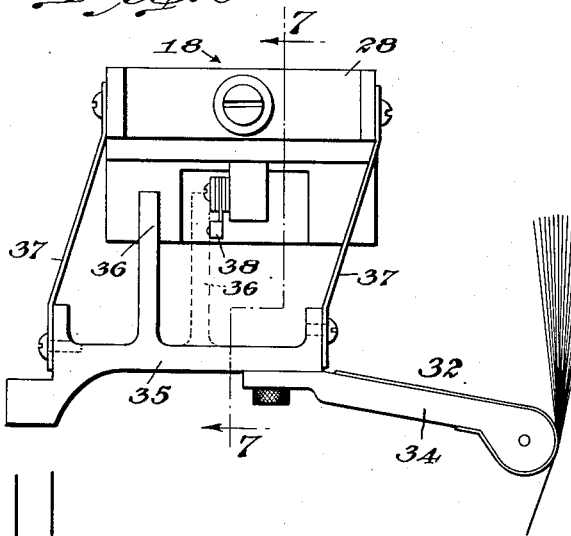
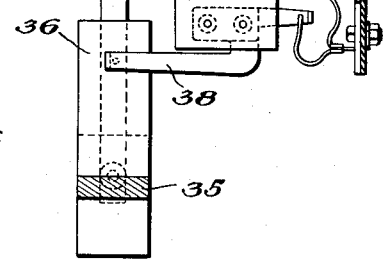
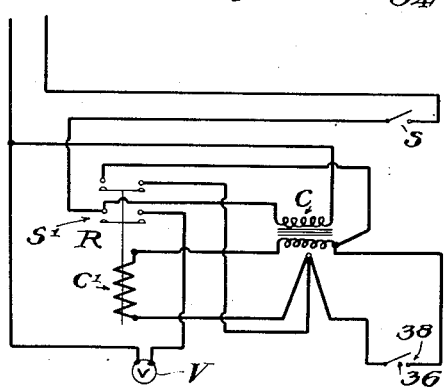

Patented Jan. 18, 1944

2,339,590

UNITED STATES PATENT OFFICE 2,339,590

PRESSURE REGULATOR

John H. Thomas, Perrysburg, and Nicholas Dragics, Newark, Ohio, assignors to Owens-Corning Fiberglas Corporation, a corporation of Delaware Application June 29, 1940, Serial No. 343,250

7 Claims. (Cl. 49—1)

The present invention relates to a pressure regulator, and particularly to a pressure regulator for blowers used in fiberizing apparatus.

In the mechanical attenuation of fibers from molten glass through multi-orifice bushings, blowers may be arranged a short distance below the bushing to direct a draft of air of other gas downwardly along the fibers and also across the surfaces of the bushing nipples from which the streams of glass issue. These blowers are operated at relatively low pressures, the flow of air being maintained at a rate that will cool the glass and render it sufficiently viscous to permit attenuation. Upon accidental breaking of one or more of the fibers in the series the molten glass issuing from the temporarily idle nipple or nipples may, by its ability to wet the material of the bushing, flow over the nipple or nipples and clog the same, sometimes spreading to adjacent nipples and hindering the drawing of fibers therefrom. In such an instance it is necessary for the operator to carefully clean the bushing and start the streams flowing again before production can be resumed. This is a time consuming operation.

An object of the present invention is to obviate the above noted difficulties in this type of fiber drawing apparatus. Toward this end the invention provides a pressure regulating mechanism by means of which the pressure of air supplied to the blowers is increased whenever the continuity of the fibers issuing from the orifices and leading to the attenuating means is interrupted. In the case where attenuation is carried out without the use of a draft of gas, as is sometimes desirable, the present invention may be employed to initiate a flow of gas upon breaking of the fibers issuing from the orifices. The increased flow of air or initiated flow, as the case may be, is sufficient to cool the nipples and the glass issuing therefrom so that the glass loses its wetting ability and does not flow back around the nipples and spread to adjacent nipples. Furthermore, by such an arrangement this flow of air issuing from the blowers after breaking of the fibers may be made to maintain a movement of the fibers issuing from certain nipples so that attenuation is effected to a certain degree and glass does not accumulate on the nipples. Such air flow and the consequent slight downward attenuating effect on the fibers which continue to issue from the nipples draws these fibers downwardly in a substantially straight line to prevent the same from whipping or swinging around in the attenuating region and entangling adjacent fibers which may be properly issuing from their respective orifices.

It is another object to provide a regulating system wherein the greater flow of fluid from the blowers is gradually attained upon interruption of fiber continuity in order than such fibers as may continue to emanate from their respective orifices will not be ruptured by a sudden blast of air.

Another object of the invention is to provide means for controlling the supply of fluid to the blowers which is associated with the conventional sizing applicator or oiler pad.

Other objects and advantages of the invention will be apparent from the following description.

In the drawings:

Figure 1 is a side elevational diagrammatic view of a fiber producing apparatus to which the present invention has been applied;

Figure 2 is a side elevational view of a piping system employed in connection with the present invention;

Figure 3 is a diagrammatic side elevational view illustrating a perfectly functioning multi-orifice bushing in which fiberization from all of the nipples and orifices thereof is taking place;

Figure 4 is a diagrammatic view similar to Figure 3 illustrating the manner in which the bushing nipples become clogged by wetting of the surrounding metal by the glass;

Figure 5 is a diagrammatic view similar to Figures 3 and 4 illustrating another manner in which fiber discontinuity at one bushing nipple may effect the operation of adjacent nipples;

Figure 6 is a side elevational view of a fiber sizing unit constructed in accordance with the present invention;

Figure 7 is a sectional view taken substantially along the line 7—7 of Figure 6; and Figure 8 is a diagrammatic view of the electrical circuit employed in connection with the pressure control apparatus of the present invention.

Referring to Figure 1, a metal bushing 10 adapted to contain a supply body of molten glass is formed with a series of nipples 12 in the bottom wall thereof, each nipple having an orifice through which molten glass is exposed to the atmosphere. The bushing may be heated, if desired, in suitable manner, as for example by electrical resistance means incorporating the metal of the bushing itself, as shown in the patent to Gossler, Number 1,954,732. The metal of which the bushing 10 is formed is preferably of a platinum alloy or other high temperature resisting metal which is capable of being wetted or has an affinity for glass at operating temperature in order that the phenomenon of capillary action may become effective at the nipples 12 to permit the molten glass to seep through the nipples and become exposed to the atmosphere below the bushing 10. The bushing may, of course, be of refractory material as shown, for example, in the von Pazsiczky Patent Number 1,427,014, and may be heated by any suitable means.

At the relatively high temperatures at which the apparatus is sometimes operated, the glass may be insufficiently viscous for attenuation of fibers from the nipples. Accordingly, in order to render the exposed areas of glass sufficiently viscous that fibers may be most effectively drawn therefrom, a pair of blowers, one of which is shown at 14, are spaced below the bushing 10 on opposite sides of the nipples 12 and the space between the bushing and blowers is preferably open and unobstructed to permit a flow of cooling air to be induced over the top of the blower and down through the space separating the two blowers. Downwardly directed jet openings 16 spaced along the inner sides of the blowers direct the fluid toward the fibers to control the temperature of the fibers. The induced air which passes over the tops of the blowers 14 serves to cool the fibers in the region of greatest plasticity and also serves to a certain extent to cool the tips of the nipples 12 themselves, especially when high pressure air is supplied to the blower in accordance with the present invention as will be pointed out hereinafter.

Ordinarily in the case of mechanical attenuation of the fibers air is supplied to the blower under relatively low pressure and the air issuing from the blower is insufficient to have any material attenuating effect upon the fibers. The flow of induced air is insufficient to chill the bushing nipples to an extent preventing wetting of the metal of the bushing and flow of the glass over the outside of the nipples. During normal operation while the fibers are being drawn from the bushings the exposed glass in the nipple orifices is consumed in the fiber forming operation and insufficient glass is available for such undesired wetting of the outside of the nipples. As mentioned previously, in some cases of operation no air normally issues from the blower during fiber attenuation.

Disposed below the blowers 14 is a combined guide and sizing applicator 18 by means of which the fibers issuing from the various nipples 12 are grouped together into the form of a strand and a sizing material such as a suitable wax, gum, resin, oil, starch solution or emulsion, or the like applied thereto. The nature of the sizing applicator and guide 18 will be pointed out hereinafter insofar as it relates to the present invention.

An attenuating means preferably combined with a packaging means is disposed below the guide 18 and consists of a spool 20 onto which the grouped fibers which have been treated with the sizing material are wound and evenly distributed by means of suitable traversing mechanism 22. The spool is designed to be rotated at high speed by means of a motor M and the strand formed of the fibers issuing from the nipples 12 is wound thereon, the fibers being attenuated by such winding.

The present invention provides a pressure regulator system for increasing the pressure of gas supplied to the blowers 14 or for supplying gas under pressure to the blowers in the case where attenuation was being effected without a flow of air from the blowers whenever cessation of fiberization occurs as will now be more fully described.

Referring to Figure 3, it will be seen that during normal fiber production a relatively fine fiber issues from each of the nipples 12 and the rate of attenuation is so great that all of the exposed glass issuing from the nipples is utilized in the fiberization process so that no excess glass is available for wetting or clogging of the nipples. This is as it should be and under normal conditions fiberization continues uninterruptedly.

Occasionally however a fiber will become ruptured and, although the remaining fibers may continue to be attenuated for a time, the glass which is exposed at the nipples from which attenuation has ceased may flow back around the outside of the nipples as shown in Figure 4. This condition if allowed to continue may eventually spread to adjacent nipples with the ultimate result that all fiberization may cease.

Under still other conditions of attenuation a bead or globule of hardened glass as indicated in Figure 5 will emerge from one of the nipples and draw a fiber from the nipple, and as soon as it has reached a region intermediate the nipple and guide 18 it may whip or swing around under action of atmosphere disturbance or of the jets of air and become entangled with other fibers, thus interfering with the smooth attenuation of adjacent fibers. Such a globule and attached fiber may also intercept some or all of the other fibers and cause complete cessation of fiberization.

If under either of the circumstances outlined above resumption of fiberization at the improperly operating nipples is not effected in time, all of the fibers may be disrupted and it is a time consuming operation for the operator to properly attend to the bushing and start the fibers flowing freely from all of the nipples again.

The present pressure regulating system provides means for automatically preventing clogging of the nipples that are not already clogged upon discontinuity of fiberization from the bushing 10. It also provides means whereby the operator may, at will, prevent clogging of additional nipples should one or more of them initially become clogged or inoperative. It further involves means whereby many, if not all, of the nipples which initially may become clogged upon cessation of fiberization therefrom may be restored to their normal condition and fiberization readily resumed with minimum effort on the part of the operator.

Toward these ends, electrical means are associated with the sizing applicator 18 (Figures 1 and 6) whereby upon discontinuity of fiberization from the bushing 10 to a predetermined degree, a relay is actuated that in turn operates a solenoid controlled valve V (Figure 2). By means of the valve sufficient gas is admitted to the blowers 14 to create a flow from the blower that will cause induced air to pass over the latter in quantities sufficient to cool the tips of the nipples 12 and solidify the glass issuing therefrom to such an extent that it will no longer wet the metal surrounding the bushing. Furthermore, such flow of air will have an attenuating effect upon any fibers which, although severed, have not actually assumed the form of a globule or bead on their respective nipples. The operator may retrieve these fibers since the slight attenuation thereof afforded by the increased volume of air flowing thereover will keep these fibers extending in a substantially straight line and moving slowly downwardly so that they do not fly about breaking adjacent fibers before they can be attended to.

The valve V may be any of the known solenoid-operated valves for controlling air or gas flow, such as the solenoid valve shown in the Hurlburt Patent No. 2,168,774 of August 8, 1939.

The sizing applicator 18 includes a tank or reservoir 26 adapted to contain the sizing material. The reservoir 26 is anchored in any suitable manner to a stationary support 28 and is provided with a drip tube 30 through which the sizing material flows and is deposited on a pad 32 secured to the guide 34. The guide 34 is secured to a swingable contact bar 35 suspended by steel straps 37 from the support 28 and having a contact 36 associated therewith designed to engage a companion contact 38 mounted on the support 28. During fiberization, when the fiberization apparatus is functioning properly, the tension applied to the fibers f by the attenuating means 20 is sufficient to displace the contact bar 35 to an extent where the contacts 36 and 38 remain separated. However, if fiberization ceases either accidentally or by action of the operator the consequent release of tension upon the guide 34 permits the contact bar 35 to move to its forward position where the contacts 36 and 38 are engaged. The springs 37 may be proportioned so that the contacts close either when substantially all of the fibers or a reasonable predetermined number are interrupted. Closing of the contacts 36, 38, effects the operation of the solenoid operated valve V to increase the pressure of the air admitted to the blowers 14 for the purpose previously described.

Referring to Figure 2, the pipe line 40 leads directly to the blowers 14 through branch conduits 42. High pressure air leading from a supply conduit 44 may be conducted directly to the conduit 40 through a manually controlled valve V¹ or it may be by-passed through a manually controlled valve V², the solenoid valve V, a surge chamber 46, and a valve V³. When the automatic pressure control system is in operation the valve V¹ may be maintained closed and cooling fluid caused to traverse the by-pass just described.

Ordinarily, the valve V¹ remains partially open and allows a predetermined amount of cooling air to pass to the blowers 14 sufficient to cool the fibers for proper attenuation. If it is found desirable to effect attenuation without flow of cooling air, the valve V' is normally fully closed. Should for any reason fiberization from a predetermined number of the nipples 12 be discontinued, the contacts 36, 38 will automatically close to operate the valve V to fully open position to admit air under increased pressure to the blowers 14 through the surge chamber 46. Such admission of air however is not sudden and it does not, therefore, rupture any fibers that remain extending from the nipples 12 ready to be retrieved by the operator. Because of the provision of the surge chamber 46 the air is gradually admitted (as a matter of a second or two) to the blower increasingly until full pressure (at least two or three pounds) as permitted by the valve V² and V³ is attained.

In the event that either of the conditions illustrated in Figures 4 and 5 obtains, the operator, if he deems it desirable, may grasp the fibers which are functioning properly and move them out of contact with the sizing applicator 18, whereupon the valve V will be actuated in the same manner as if the fibers had automatically become severed. The resultant increase of air pressure at the blowers 14 will preserve these fibers and cause them to be slowly attenuated, and the nipples from which they emanate will be kept clear until the operator can remedy the condition of the other nipples. If the other nipples which are not functioning properly are not too badly clogged at the outset, the increased flow of air from the blowers, or initiation of flow as the case may be, will frequently cause automatic remedy of the condition. The increase of initiation of flow of induced air over the top of the blowers 14 will in some cases pick up the glass and commence attenuating it. Otherwise fiberization is restored by means of a bait. It is then a relatively simple matter for the operator to thread all of the fibers over the guide 34 and begin complete fiberization again.

Referring now to Figure 8 illustrating the electrical circuit by means of which the control system is operated, a master switch S when closed causes energization of the primary side of an induction coil C. Upon closing of the contacts 36, 38, the circuit of the secondary side of the coil C is closed and current flows through the coil C¹ of a relay R and thus moves the relay switch S¹ to closed position. Closing of the switch S¹ permits current to flow through the circuit including the coil of the solenoid valve V which thereupon becomes fully open to obtain the condition of increased or initiation of flow of cooling air at the blowers 14 in the manner and for the purpose previously described. Closing of the relay switch S¹ also completes a holding circuit through the secondary side of the induction coil C by means of which the relay switch R is maintained closed until such time as the master switch S is opened. In this manner should the contacts 36, 38 open upon subsequent swinging of the contact bar 35 after initial closing of these contacts the opening thereof is nullified and the high pressure cooling air continues to emerge from the blowers 14.

Modifications may be resorted to within the spirit of the invention and the scope of the appended claims.

We claim:

1. The combination with a bushing having orifices through which flow molten glass streams to be attenuated into fibers, a blower arranged to direct a draft of cooling medium over the streams adjacent the bushing, and attenuating means spaced from the bushing for attenuating the streams into fibers, of cooling medium supply means including a valve and a surge chamber arranged in series in communication with the blower, a solenoid operable upon energization to actuate the valve and permit flow of cooling medium to the blower at predetermined pressure, a switch in circuit with said solenoid including a movable contact and a stationary contact, resilient means supporting said movable contact and normally urging the contacts into engagement, and a guide disposed between the bushing and attenuating means over which the fibers being attenuated pass, said guide being secured to said movable contact whereby tension of the fibers being attenuated will maintain the contacts out of engagement and decrease in tension of the fibers will permit closing of the contacts for actuation of said valve.

2. In glass fiber attenuating apparatus the combination with means for attenuating fibers from streams of molten glass and a blower for directing cooling fluid on said streams, of means for supplying cooling fluid to said blower including an electrically operated valve, a switch in circuit with said valve arranged to cause opening of the valve upon switch actuation, a movably mounted sizing applicator having operative connection with the switch, and means resiliently urging said applicator against the fibers, said resilient means acting to move said applicator and thereby operate said switch upon cessation of fiber attenuation.

3. In glass fiber attenuating apparatus the combination with means for attenuating fibers from streams of molten glass flowing from a bushing and a blower adjacent said bushing for directing a gaseous draft onto said streams in the attenuating region, of a supply for gas under pressure, an electrically operated valve connecting said supply to said blower, a switch electrically connected with said valve to cause opening of said valve upon switch actuation, a switch-operating member mounted for movement toward and away from the fibers being attenuated, resilient means for urging said member toward the fibers and in a direction to operate said switch, said member being held in inoperative position by engagement with the fibers being attenuated, whereby said member is moved by said resilient means and the switch is thereby operated to open the valve upon cessation of attenuation to a predetermined degree.

4. In glass fiber attenuating apparatus the combination with a bushing from which flow streams of molten glass, means for attenuating fibers from said streams of molten glass and a blower adjacent said bushing for directing a gaseous draft onto said streams in the attenuating region, of a supply for gas under pressure, an electrically operated valve connecting said supply to said blower, a surge chamber in series with said valve and blower, a switch electrically connected with said valve to cause opening of said valve upon switch actuation, a switch-operating member mounted for movement toward and away from the fibers being attenuated, resilient means for urging said member toward the fibers and in a direction to operate said switch, said member being held in inoperative position by engagement with the fibers being attenuated, whereby said member is moved by said resilient means and the switch is thereby operated to open the valve upon cessation of attenuation to a predetermined degree.

5. In glass fiber attenuating apparatus the combination with a bushing from which flow streams of molten glass, means for attenuating fibers from said streams of molten glass and a blower adjacent said bushing for directing a gaseous draft onto said streams in the attenuating region, of a supply for gas under pressure, a valve connecting said supply to said blower, means operatively connected with said valve to cause opening of said valve upon actuation of said means and including a movable member, resilient means for urging said member against the fibers and into valve opening position, said member being held in inoperative position by engagement with the fibers being attenuated, whereby said member is moved by said resilient means and the valve is thereby opened upon cessation of attenuation to a predetermined degree.

6. In glass fiber attenuating apparatus the combination with a bushing for flowing streams of molten glass, means for attenuating fibers from said streams and a blower for directing a gaseous draft onto said streams in the attenuating region, of a member between said bushing and said attenuating means over which said fibers pass as they are attenuated, resilient means for supporting said member and urging it against said fibers, a supply for gas under pressure, an electrically operated valve connecting said supply to said blower, a switch electrically connected with said valve to cause opening of said valve upon switch actuation including a stationary contact and a contact secured to said member, said contacts being held in spaced relation by engagement of the fibers being attenuated with said member and adapted to close upon movement of said member under action of said resilient means, whereby said switch is operated to open the valve upon cessation of attenuation to a predetermined degree.

7. In glass fiber attenuating apparatus the combination with a bushing for flowing streams of molten glass, means for attenuating fibers from said streams and a blower for directing a gaseous draft onto said streams in the attenuating region, of a supply for gas under pressure, regulatable means connecting said supply to said blower to vary the pressure of the gas at said blower, a sizing applicator between said bushing and said attenuating means over which said fibers pass as they are attenuated, resilient means for urging said applicator against the fibers, and means operatively connecting said regulatable means with said applicator, whereby movement of said applicator under action of said resilient means causes variation of the gas pressure at said blower.

JOHN H. THOMAS.
NICHOLAS DRAGICS.